G. E. ROBINSON.
ADJUSTABLE CONCEALED AUTO STRAP FASTENER.
APPLICATION FILED MAY 27, 1912. RENEWED AUG. 13, 1913.
1,081,152.
Patented Dec. 9, 1913.
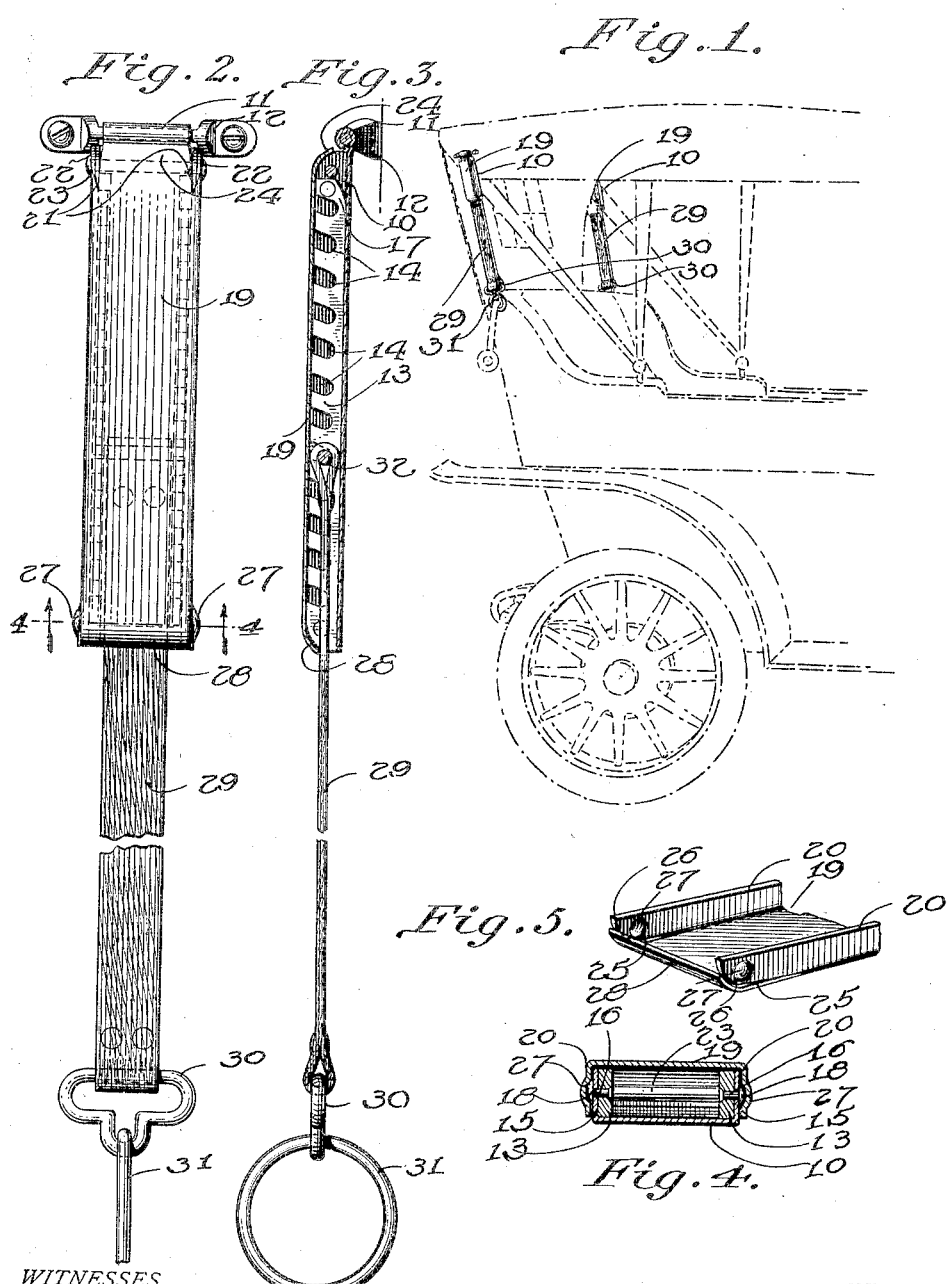
WITNESSES
INVENTOR
George E Robinson
By E E Vrooman, his Attorney

UNITED STATES PATENT OFFICE.

GEORGE E. ROBINSON, OF MEDFORD, OREGON.

ADJUSTABLE CONCEALED AUTO-STRAP FASTENER.

1,081,152. Specification of Letters Patent. Patented Dec. 9, 1913.

Application filed May 27, 1912, Serial No. 699,984. Renewed August 13, 1913. Serial No. 784,611.

*To all whom it may concern:*

Be it known that I, GEORGE E. ROBINSON, a citizen of the United States, residing at Medford, in the county of Jackson and State of Oregon, have invented certain new and useful Improvements in Adjustable Concealed Auto-Strap Fasteners, of which the following is a specification, reference being had therein to the accompanying drawing.

This invention relates to straps which are used as braces for the top of an automobile, and the principal object of the invention is to so construct the strap that it may be readily adjusted thus making it possible to regulate the tension which is applied to the automobile top.

In this invention there is provided a housing carried by the automobile top and a strap which is connected to the frame of the machine and has one end adjustably mounted in the housing so that the length of the strap may be regulated.

In the accompanying drawings:—Figure 1 is a view showing the device in use. Fig. 2 is a plan view of the strap. Fig. 3 is a longitudinal sectional view through the housing with the strap mounted therein. Fig. 4 is a section along the line 4—4, Fig. 2. Fig. 5 is a fragmentary view of the free end of the cover for the housing.

Referring to the accompanying drawings it will be seen that this invention comprises a housing which is secured to the cover of the automobile and which comprises the body portion 10 which has one end rolled to form the hinge ear 11 through which the securing bracket 12 passes. This bracket 12 is secured to the cover of the automobile and the housing is pivotally connected with the bracket, thus permitting the desired amount of side play necessary.

Bars 13 provided with notches 14 are secured to the side walls 15 by means of rivets 16, and it should be noted that the end 17 of each bar is curved so that a space is left between the end of the bar and the bottom of the body portion. It should also be noted that the rivets which are at the free end of the body portion are provided with enlarged heads 18 and form locking means so that the cover of the device will be held in closed position.

The cover 19 fits upon the body portion with its side walls 20 positioned outside the side walls of the body portion and is provided with slits 21 at one end to form the pivot ears 22. A pivot pin 23 passes through the side walls of the body portion and through the pivot ears 22 so that the cover will be pivotally mounted.

The end of the cover between the pivot ears 22 is curved as shown at 24 to form a stop which comes in contact with the curved end 17 of the bars 13, when the cover is turned back thus limiting the pivotal movement of the cover.

The free end of the cover is provided with slits 25 to form ears 26, each of which is provided with a pocket 27 in which the heads 18 of the securing rivets at the free end of the body portion are adapted to fit.

The metal from which the cover is formed is spring metal, and it will thus be seen that since it is necessary to spring the ears 26 apart slightly in order to permit the heads 18 of the rivets to pass into the pockets 27 that frictional engagement will be caused, thus holding the cover in a closed position.

The end portion 28 of the cover is curved, as shown in Fig. 5 so that when the cover is closed it extends over the end of the body portion, thus to a certain extent closing the opening formed in the end of the body portion when the cover is closed.

The strap 29 is provided with an eye 30 at its outer end in which there is positioned a ring 31 adapted to be connected with the frame of the automobile. A bar 32 is carried by the inner end of the strap and is of a greater length than the width of the strap so that the exposed ends of the bar will fit into the notches 14, thus adjustably mounting the strap in the body portion. After the housing has been connected with the cover of the automobile and the strap connected with the body portion of the automobile the free end of the strap is placed in the housing with the bar having its ends positioned in the desired notches. The cover 19 is then moved to the position shown in Figs. 2 and 3 and the strap will then be firmly held in adjusted position since the bar cannot slip out of the notches without raising the cover and this is prevented by the frictional engagement between the ears 26 and the bolt heads 18.

It should also be noted that when it is desired to adjust the strap that this can be easily done since it is merely necessary to raise the cover 19 and move the bar to the desired set of notches and then reclose the cover.

There has thus been provided a simple and efficient device of the kind described, and for the purpose specified.

Having thus described the invention, what is claimed as new is:—

1. A device of the character described comprising a body portion, bars carried by the side walls of said body portion and provided with alined notches, said bars being provided with curved ends, the curved ends of said bars being in spaced relation to the bottom of said body portion, a pivot pin passing through the side walls of said body portion, a cover with the side walls at one end separated from the central portion to form pivot ears pivotally connected with said pivot pin and the central portion being curved to form a stop passing between the side walls of said body portion and engaging the curved ends of said bars to limit the pivotal movement of said cover, a strap fitting within said body portion, and a bar carried by the inner end of said strap and having its ends fitting within said notches whereby said strap will be held in an adjusted position when said cover is closed.

2. A device of the character described comprising a body portion, bars extending along the side walls of said body portion, a pivot pin passing through said body portion, a cover with the side walls at one end separated from the central portion to form pivot ears pivotally connected with said pivot pin and the central portion being bent to form a stop passing between the side walls of said body portion and engaging said bars to limit the pivotal movement of said cover, a strap fitting within said body portion, and means at the inner end of said strap to adjustably connect said strap with said bars and held in its adjusted position by the closing of said cover.

In testimony whereof I hereunto affix my signature in presence of two witnesses.

GEORGE E. ROBINSON.

Witnesses:
FRANK W. BARTLETT,
CARL FICHTNER.

---

Copies of this patent may be obtained for five cents each, by addressing the "Commissioner of Patents, Washington, D. C."